UNITED STATES PATENT OFFICE.

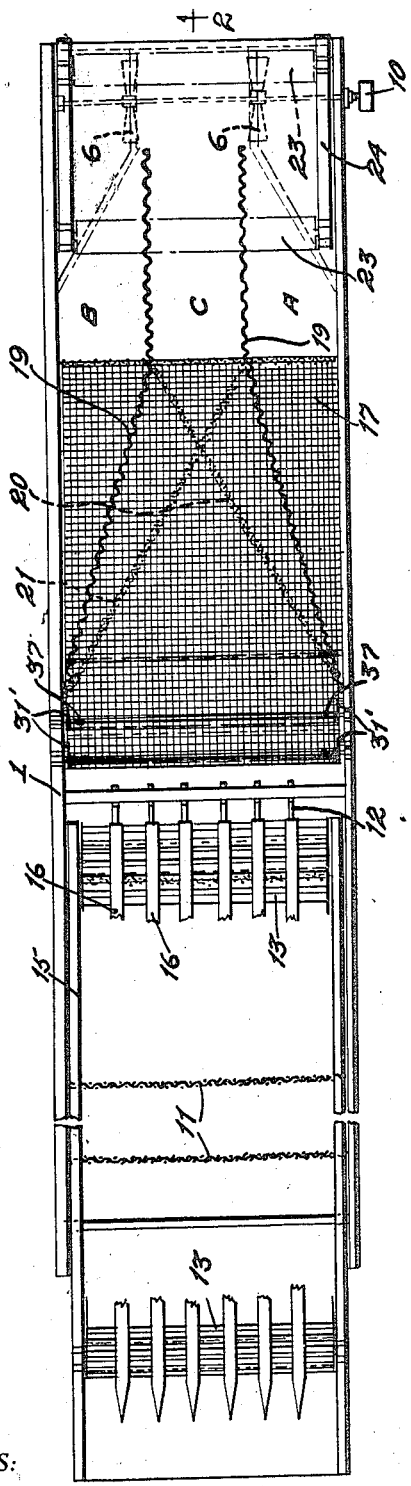

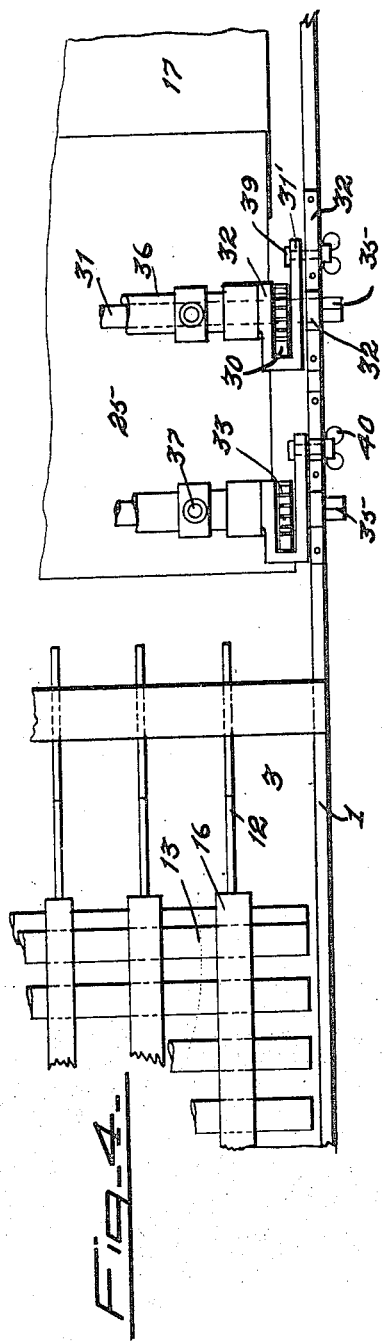
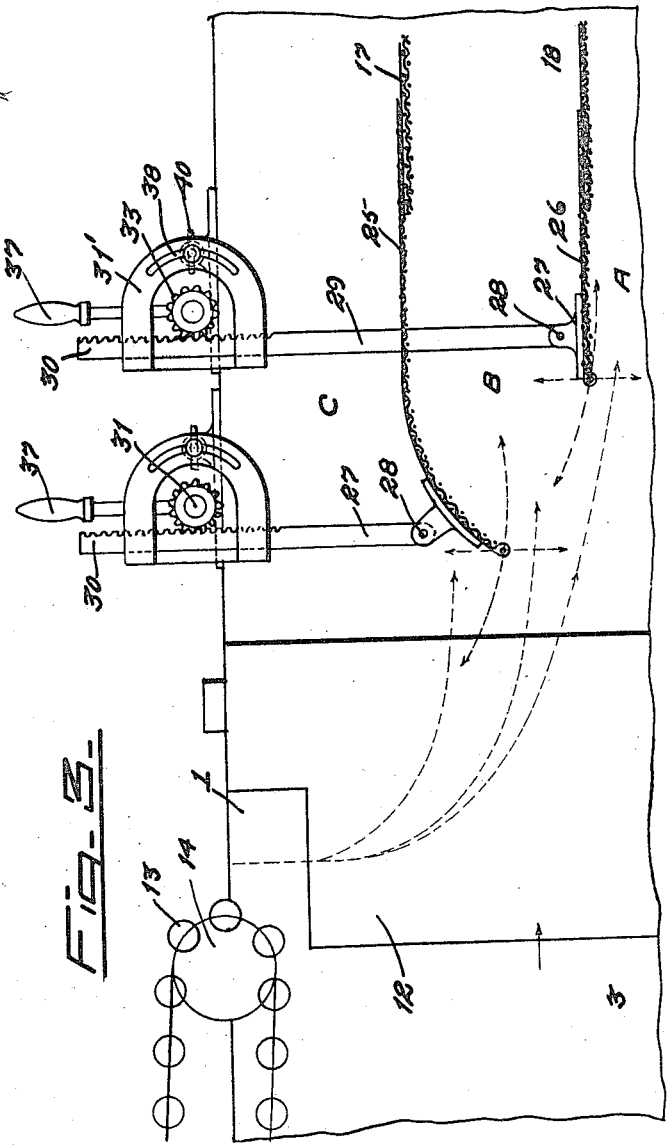
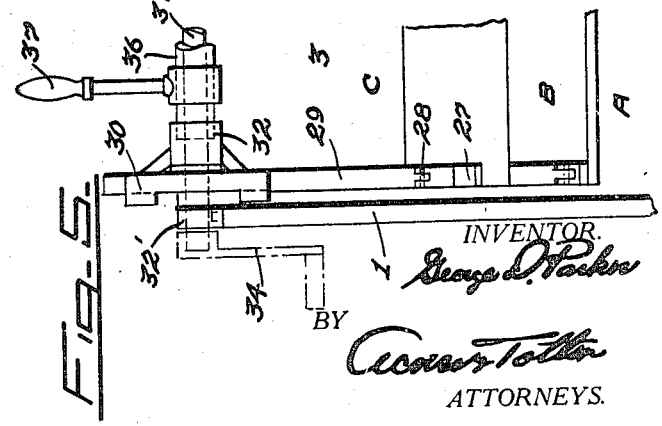

GEORGE D. PARKER, OF RIVERSIDE, CALIFORNIA.

GRAVITY FRUIT-SEPARATING APPARATUS.

1,252,833.  Specification of Letters Patent.  Patented Jan. 8, 1918.

Application filed May 15, 1917. Serial No. 168,833.

*To all whom it may concern:*

Be it known that I, GEORGE D. PARKER, a citizen of the United States, residing at Riverside, in the county of Riverside and State of California, have invented certain new and useful Improvements in Gravity Fruit-Separating Apparatus, of which the following is a specification.

The present invention relates to fruit separators of that type wherein the fruit bodies to be separated are dropped from a predetermined level into a tank containing a circulating fluid body and a submerging separating member, and wherein the fruit in accordance with its submergence in the liquid, dependent on its specific gravity, travels in the fluid at different angles and either clears the separating member or is carried by the fluid flow beneath the same, the particular type of apparatus being set forth in Letters Patent No. 1,186,677, granted to me on the 13th day of June, 1916.

The present invention has for its principal objects to provide an improved separating means by the employment of which the fruit may be separated into three or more grades and by the adjustment of which either as to depth in the fluid or as to distance from the dropping means, enables a more exact and satisfactory separation of the fruit to be obtained in accordance with the specific gravity thereof. The improved separating means enables fruit bodies of different sizes, shapes and specific gravity to be separated in accordance with their specific gravity, regardless of their size and shape, as it often happens that smaller and irregular fruit bodies are of as good quality as to juiciness as the larger and more nearly perfect fruit bodies.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in plan of the preferred embodiment of my improved separator.

Fig. 2 is a longitudinal sectional view, taken on line 2—2 of Fig. 1.

Fig. 3 is a broken detail view of the separating members extending transversely of the upper compartment and illustrating the adjusting means for the same.

Fig. 4 is a detail top plan view of the adjusting means illustrated in Fig. 3.

Fig. 5 is a detail view in elevation of the adjusting means illustrated in Figs. 3 and 4.

Referring more particularly to the several views of the drawings, wherein like characters of reference designate corresponding parts, the numeral 1 indicates a suitable open topped receptacle, preferably oblong in shape, for containing fluid, such as water, preferably maintained therein to a level slightly below the upper edge thereof.

Extending longitudinally and transversely of the receptacle is a wall 2 which divides the receptacle into the upper and lower compartments or passages 3 and 4. The passages are connected at one end of the receptacle by an opening 5 and at their opposite end through openings 6 formed in the wall 2 adjacent the side edges thereof. The fluid is maintained in circulation from the lower compartment to the upper, in the direction of the arrows, Fig. 2, by suitable agitating blades or wheels 8 positioned within the openings 6 and carried by a shaft 9 rotatably mounted in suitable journals. The shaft projects through a bushing in the side edge of the receptacle 1 and carries on its end a suitable band pulley 10 adapted to receive power from any suitable source. To overcome eddy currents in the upper compartment 3 suitable screens 11 are provided which extend transversely thereof, and in order to direct the fruit in a plane parallel with the side walls of the receptacle there are provided suitable separated guide boards or directing plates 12 disposed vertically in the upper compartment 3 in rear of the last screen 11.

The fruit to be treated is conveyed to the receptacle by a suitable endless conveyer 13 of any well known type, supported at its ends on rolls 14 carried between side members 15, and if desirable the inner ends of said side members which terminate directly above the boards 14 may be adjusted vertically relative to the upper compartment 3, thereby regulating the drop of the fruit from the endless conveyer into the circulating fluid.

The fruit as conveyed is maintained in rows by the guides 16 which are longitudinally disposed in parallel spaced relation over the endless conveyer 13 and which terminate directly over the boards 12. The guides 16 direct the fruit between the boards 12 and prevent the same from striking the upper edges of said boards 12.

The upper compartment 3 is divided into three open ended separating compartments A, B and C, by the transversely extending longitudinally disposed upper and lower separating members 17 and 18, preferably formed of screen material, and said members extend from a point a short distance in front of the front edge of the boards 12 to a point adjacent the opposite end of said receptacle 1.

In order to direct the separated fruit caught beneath the screens 17 and 18 and that rising above the upper surface of the screen 17, into different paths, there is provided the converging screen wall members 19 above the member 17 and a directing wall 20 immediately below said member 17, said wall 20 extending from the right hand wall of the receptacle 1 rearwardly to a point immediately below its point of intersection with the left hand converging wall 19. Below the dividing wall 18 is another wall 21 which extends preferably from the left hand side of the receptacle 1 rearwardly to a point immediately below its point of intersection with the right hand wall 19. Beyond the intersecting points of the walls 20 and 21 with the converging walls 19, said walls 19 extend from the dividing wall 2 to a point substantially flush with the top of the side walls of the receptacle 1 and are adapted to overlie a suitable upwardly inclined endless conveyer 22 at the rear of said upper compartment 3, the conveyer 22 operating over suitable rolls 23 at the opposite ends of an inclined frame 24 removing the separated fruit from the rear of the receptacle 1.

It will be apparent that the fruit in accordance with its specific gravity and consequent submergence in the fluid is carried by the flow of the fluid into either of the compartments A, B or C and then carried through said compartments by the flow of the fluid onto the endless conveyer 22 which removes the different grades from the apparatus.

From Fig. 3 of the drawings it will be observed that the fruit is separated into three grades, namely that which is frozen, that which is slightly frosted or contains but little juice and that which is not frozen and contains the usual amount of juice.

In order to obtain an efficient separation of the fruit in accordance with its submergence in the fluid, adjustable lips or guides 25 and 26 are provided at the forward edges of the respective dividing screens or walls 17 and 18, said members 25 and 26 preferably overlapping the forward edges of the respective walls 17 and 18, and are slidably mounted thereover, as in Fig. 3 of the drawings. Attached to the forward edges of the respective members 25 and 26, are suitable shoes 27 to each of which is pivotally mounted, as at 28, the lower end of a supporting bar 29, each provided with rack edges 30 at its upper end, and each of the said supporting bars 29 is retained in a suitable vertical guide 30 having a segmental wall 31' at one side and a suitable bearing member 32 at the other. It will be observed that each lip or guide is supported at its opposite side edges by the bars 29. Passing through opposite guides of each pair and through the bearings 30 thereof is a transversely disposed supporting shaft 31 held at its opposite ends in bearings 32' resting on the upper side edges of the side walls of the receptacle 1.

Coöperating with the rack teeth 30 of the supports 29 are the pinions 33 fixed to the shafts 31, so that the rotation of said shafts, as for instance, by the operation of a crank 34 positioned over the squared end 35 thereof, will raise and lower the free ends of the respective flexible lips or guide members 25 and 26 and thus regulate the height thereof in the fluid to control the fruit of any given gravity passing below the same, as indicated diagrammatically in Fig. 3.

Loosely surrounding the respective shafts 31 and attached to the guides 30 are the respective tubular members 36 each having upwardly extended therefrom an operating handle 37, said handles being capable of movement concentrically of the shafts to vary the angle of position of the respective supporting members 29 and to position the outer free ends of the respective members 25 and 26 either closer to or at a greater distance from the point of entrance of the fruit to be separated into the fluid. The yokes 31' are each formed with an arcuate slot 38 through each of which passes a suitable retaining bolt 39 carried by the bearing members 32 and with which coöperate the winged nuts 40 capable of adjustment to retain said members in their set position.

In operation the fruit to be separated is delivered to the tank or receptacle 1 by the conveyer 13 preferably in longitudinal rows between the members or guides 16, and as conveyed drops from the end of the conveyer between the guide boards 12 into the fluid which is moving in the direction of the arrows—Figs. 2 and 3. When dropped from the same level the good fruit or that which is not frosted and is juicy and is of great specific gravity will submerge to a greater depth within the fluid than the fruit of less gravity or that which has been frozen or only slightly frosted or which is lacking in juice and which is consequently of less specific gravity than that of the good fruit. Before the buoyancy of the slightly frosted fruit and the good fruit will permit it to rise an appreciable distance in the fluid, the flow of the fluid will have carried it beneath the forward edge of the adjustable lip or section 25 of the upper dividing member 17, thus the adjustment of the forward member 25 controls the separation of the good and slightly frosted fruit or the good juicy fruit and the good fruit lacking in juiciness from that which has been frozen.

The flow of the fluid carries both of these grades of fruit toward the rear of the receptacle, but owing to the lighter specific gravity of the slightly frosted fruit or that lacking in juice over the unfrosted or juicy fruit, the former will rise more rapidly in the fluid than the latter and consequently pass above the forward edge of the separating lip 26 into the compartment B, the fruit of greater specific gravity or that which is juicy and good being carried into the compartment A. The frosted fruit or that of the lighter specific gravity rises in the fluid prior to being carried by the flow thereof beneath the forward edge of the adjustable separating lip 25, and thus passes or is carried into the upper compartment C. The separated fruit is carried longitudinally of the respective compartments and is deposited by the action of the fluid onto the endless conveyer 22 which removes it from the apparatus.

While I have illustrated an apparatus capable of separating fruit into three grades, it is to be understood that a greater number of partitions may be employed if it is desired to separate the same into more grades.

By downwardly curving the forward portion of the lip 25, as in Figs. 2 and 3, the fruit passing thereunder and contacting with the same adjacent its free edge, travels upwardly relative thereto, leaving the free edge unobstructed at all times and preventing fruit being caught below the same, and owing to congestion at the free edge thereof from passing upwardly thereover into the compartment C.

The exactness of the separation in my improved apparatus is accomplished by the independent adjustment of the free ends of the dividing members vertically of the receptacle 1 and longitudinally of the same relatively to the point of admittance of the fruit to be separated into the tank.

It is apparent that the members or lips 25 and 26 are capable of adjustment independently of each other and of movement independently of the coöperating members 17 and 18, and while I have illustrated the preferred form of members or lips as being independent of the dividing members 17 and 18, it is understood that the same and the adjusting means may be constructed in a manner different from that illustrated, and I therefore desire to protect the same as broadly as the state of the art will permit.

Having thus described my invention, what I claim as new and desire to protect by Letters Patent is:—

1. An apparatus for the treatment of fruit for separating the same in accordance with the difference in the specific gravity thereof, comprising a receptacle for containing a flowing fluid and into which the fruit to be treated is submerged, means for supplying fruit to the receptacle adjacent to one of its ends, a longitudinally extending dividing wall within said receptacle for dividing the same into a plurality of open ended channels arranged in different horizontal planes and through which the fruit is carried by the flowing fluid body in accordance with the specific gravity thereof, and means for adjusting the receiving end of said dividing wall vertically and longitudinally relative to said receptacle.

2. An apparatus for the treatment of fruit for separating the same in accordance with the difference in the specific gravity thereof, comprising a receptacle for containing a flowing fluid and into which the fruit to be treated is submerged, means for supplying fruit to the receptacle adjacent to one of its ends, a plurality of longitudinally extending dividing walls arranged one above the other in spaced relation within said receptacle for dividing the same into a plurality of open ended channels arranged in different horizontal planes and through which the fruit is carried by the flowing fluid body in accordance with the specific gravity thereof, and means for independently varying the distance of the receiving ends of said dividing walls relatively to the point of admittance of the fruit to be separated into the receptacle.

3. An apparatus for the treatment of fruit for separating the same in accordance with the difference in the specific gravity thereof, comprising a receptacle for containing a flowing fluid and into which the fruit to be treated is submerged, means for supplying fruit to the receptacle adjacent to one of its ends, a plurality of longitudinally extending dividing walls arranged one above the other in spaced relation within said receptacle for dividing the same into a plurality of open ended channels arranged in different horizontal planes and through which the fruit is carried by the flowing fluid body in accordance with the specific gravity thereof, and means for independently adjusting the receiving ends of said dividing walls both longitudinally and vertically of the receptacle.

4. An apparatus for the treatment of fruit for separating the same in accordance with the difference in the specific gravity thereof, comprising a receptacle for containing a flowing fluid body and into which the fruit to be treated is submerged, means for supplying fruit to the receptacle adjacent one of its ends, a plurality of longitudinally extending dividing walls arranged one above the other in spaced relation within said receptacle, the ends thereof adjacent the fruit supplying means being capable of independent longitudinal adjustment relatively to the receptacle, said walls dividing the receptacle into a plurality of open ended channels arranged in different horizontal planes and through which the fruit is carried by the flowing fluid body in accordance with the specific gravity thereof, and means for retaining the adjustable ends of said dividing walls in their adjusted position.

5. An apparatus for the treatment of fruit for separating the same in accordance with the difference in the specific gravity thereof, comprising a receptacle for containing a flowing fluid body and into which the fruit to be treated is submerged, means for supplying fruit to the receptacle adjacent one of its ends, a plurality of longitudinally extending dividing walls arranged one above the other in spaced relation within said receptacle, the ends thereof adjacent the fruit supplying means being capable of independent vertical and longitudinal adjustment relatively to the receptacle, said walls dividing the receptacle into a plurality of open ended channels arranged in different horizontal planes and through which the fruit is carried by the flowing fluid body in accordance with the specific gravity thereof, and means for retaining the adjustable ends of said dividing walls in their adjusted position.

6. An apparatus for the treatment of fruit for separating the same in accordance with the difference in the specific gravity thereof, comprising a receptacle for containing a flowing fluid into which the fruit to be treated is submerged, means for supplying fruit to the receptacle adjacent to one of its ends, a longitudinally extending dividing wall within said receptacle for dividing the same into a plurality of open ended channels arranged in different horizontal planes and through which the fruit is carried by the flowing fluid body in accordance with the specific gravity thereof, an adjustable lip or member coöperating with said dividing wall or member at its receiving end, and means for adjusting said lip or member longitudinally or vertically of the receptacle.

7. An apparatus for the treatment of fruit for separating the same in accordance with the difference in the specific gravity thereof, comprising a receptacle for containing a flowing fluid and into which the fruit to be treated is submerged, means for supplying fruit to the receptacle adjacent to one of its ends, and a plurality of longitudinally extending dividing walls arranged one above the other in spaced relation within said receptacle for dividing the same into a plurality of open ended channels arranged in different horizontal planes and through which the fruit is carried by the flowing fluid body in accordance with the specific gravity thereof, the receiving ends of said walls starting successively later from top to bottom.

8. An apparatus for the treatment of fruit for separating the same in accordance with the difference in the specific gravity thereof, comprising a receptacle for containing a flowing fluid and into which the fruit to be treated is submerged, means for supplying fruit to the receptacle adjacent to one of its ends, a plurality of longitudinally extending dividing walls arranged one above the other in spaced relation within said receptacle for dividing the same into a plurality of open ended channels arranged in different horizontal planes and through which the fruit is carried by the flowing fluid body in accordance with the specific gravity thereof, a movable lip or guide at the end of each wall adjacent to the point of admittance of the fruit into the receptacle, and independently operated means coöperating with the respective lips or guides for adjusting the same either vertically or longitudinally of said receptacle.

In testimony whereof I have signed my name to this specification in the presence of two subscribing witnesses.

GEORGE D. PARKER.

Witnesses:
CHAS. F. BROOKHART,
S. A. MARKS.